United States Patent
Übelein

[19]

[11] Patent Number: 6,135,778
[45] Date of Patent: Oct. 24, 2000

[54] DEVICE FOR PRODUCING AN ELECTRICAL PLUG-IN CONNECTION BETWEEN ELECTRICAL OR ELECTRONIC COMPONENTS OR SUB-ASSEMBLIES

[75] Inventor: Jörg Übelein, Grub am Forst, Germany

[73] Assignee: Brose Fahrzeuteile GmbH & Co. KG

[21] Appl. No.: 09/297,708

[22] PCT Filed: Dec. 12, 1997

[86] PCT No.: PCT/DE97/02942

§ 371 Date: May 5, 1999

§ 102(e) Date: May 5, 1999

[87] PCT Pub. No.: WO98/25799

PCT Pub. Date: Jun. 18, 1998

[30] Foreign Application Priority Data

Dec. 12, 1996 [DE] Germany ............................ 196 53 733

[51] Int. Cl.[7] .................................................. H01R 33/00
[52] U.S. Cl. .............................................................. 439/34
[58] Field of Search ............................. 439/34, 211, 247, 439/248, 249; 174/72 A; 29/854, 857

[56] References Cited

U.S. PATENT DOCUMENTS

| | | | |
|---|---|---|---|
| 4,794,735 | 1/1989 | Batchelder et al. | 49/503 |
| 4,800,648 | 1/1989 | Nakayama et al. | 29/854 |
| 4,815,984 | 3/1989 | Sugiyama et al. | 439/211 |
| 5,092,647 | 3/1992 | Ueda et al. | 296/146 |
| 5,245,258 | 9/1993 | Becker et al. | 318/266 |
| 5,501,609 | 3/1996 | Watanabe | 439/277 |
| 5,545,061 | 8/1996 | Sawayanagi | 439/752 |
| 5,931,682 | 8/1999 | Takiguchi et al. | 439/34 |

FOREIGN PATENT DOCUMENTS

| | | |
|---|---|---|
| 0 534 659 A2 | 3/1993 | European Pat. Off. . |
| 32 39 370 C2 | 9/1983 | Germany . |
| 33 09 149 C1 | 10/1984 | Germany . |
| 35 29 660 C2 | 2/1986 | Germany . |
| 35 30 413 A1 | 2/1987 | Germany . |
| 36 191 83 A1 | 12/1987 | Germany . |
| 38 04 086A1 | 8/1988 | Germany . |
| 39 28 685 C1 | 1/1991 | Germany . |
| 40 197 87 A1 | 1/1991 | Germany . |
| 2 108 912 | 5/1983 | United Kingdom . |

*Primary Examiner*—Neil Abrams
*Assistant Examiner*—Chandrika Prasad
*Attorney, Agent, or Firm*—Christie, Parker & Hale, LLP

[57] ABSTRACT

This invention concerns a device for producing an electrical plug-in connection between electrical or electronic components or sub-assemblies by means of the opening in a wall within a motor vehicle door. The wall defines a partition between a wet cell and a dry cell wherein the component part or subassembly is mechanically fixed in the wet cell by a housing of a component part holder and wherein a part of the holder forms an electrical plug-in connector that engages through a duct opening in the wall and seals the duct opening against dampness. To that effect, the components or sub-assemblies can be mechanically secured by at least one component bracket in the vehicle door. According to the invention, at least one part of the component brackets of at least one of the components or sub-assemblies to be connected electrically is designed as an electrical plug-in connector which passes through the opening of the wall. The invention provides a connecting device which has a duct through a wall and is economical and easy to mount and service and at the same time has a long life.

12 Claims, 3 Drawing Sheets

DEVICE FOR PRODUCING AN ELECTRICAL PLUG-IN CONNECTION BETWEEN ELECTRICAL OR ELECTRONIC COMPONENTS OR SUB-ASSEMBLIES

BACKGROUND OF THE INVENTION

The invention relates to a device for producing an electrical plug-in connection between electrical or electronic component parts or sub-assemblies.

From DE 32 39 370 C2 a vehicle door is known having an outer door panel which has a support frame with a recess for a window pane. An assembly support holds the door fittings such as window pane, window raiser mechanism and door lock and is made separately from the outer door panel, is assembled together and fitted on the outer door panel. An inner door trim forms the closure between the vehicle door and interior of the vehicle and is connected to the assembly support or to the outer door panel.

From DE 35 29 660 C2 a vehicle door is known having an outer door panel, a door frame and an inner door panel which has several cut-out sections which are covered by a support plate. The support plate is provided with a cable tree which has several branches which are fixed by connectors such as adhesive tapes to the support plate and have at their ends connecting plugs which can be connected to the different electrical fittings of the door such as window raiser motor, door lock, opening switch for the boot, etc.

From U.S. Pat. No. 4,794,735 a modular vehicle door is known which is comprised of an outer door skin, a door module with a door frame and a side impact protection as well as an inner trim. A drive unit for a window raiser as well as a door lock mechanism are mounted on the side impact protection. A cable tree is connected to the door module and guided through the connecting side of the vehicle door and in turn is provided with plug-in connections which are connected to the electrical device.

DE A 38 04 086 A1 describes a cable tree assembly in a protective lead housing with openings for passing through electrical plugs and which is mounted by screws on the inner trim of vehicle doors.

DE-A 38 04 086 A1 describes a cable tree assembly in a protective lead housing with openings for passing through electrical plugs and which is mounted by screws on the inner trim of vehicle doors. The plugs are thereby mounted displaceable through resilient bearing arms in the openings of the housing in order to compensate for any inaccuracies in the position between the component parts fixed in the inside wall of the door and the plugs.

DE 35 30 413 A describes a component kit for laying electric leads wherein the electrical contacting of the plug-in parts is produced through a shape-stable support part in which full-length plug parts in the form of conducting pins are formed. A shaped or cover part is fitted onto this support part in order to line the electrical plug parts from the interior.

U.S. Pat. No. 4,800,648 describes a device wherein the electrical leads provided with the plugs of the electrical components mounted in a vehicle door frame are guided out from openings in the inner door panel up to level with the inner trim. Between the inner trim and the inner door panel is a cable tree with plugs which are likewise extended out up to the level of the inner trim and lie next to the plugs of the components. The relevant components are connected by bridges through the cable tree to the corresponding switches or power supply leads.

From EP 0 534 659 A2 an arrangement of several cable trees in a vehicle door is known wherein the components mounted inside a door frame are fitted completely with the cables of the cable tree prior to fitting the inner trim. The switches on the inner trim are likewise connected to a cable tree wherein the cable trees each open into a multipoint plug and these are brought into contact with each other when assembling the door frame and inner trim.

By attaching flexible extruded sealing profiles between the assembly support or support plate and the inner door panel or by covering the various types of openings on the inside of a vehicle door by means of a large-surface watertight foil the inside of the vehicle door is divided into a wet cell lying between the outer door panel and the support plate, assembly support or the like as well as where applicable the watertight foil, and a dry cell of the vehicle door lying between the assembly support or support plate and the inner door trim. Through suitable sealing measures in the area of the support plate, assembly support or the like, moisture is prevented from penetrating into the dry cell and thus to the space adjoining the inner door trim.

Various vehicle door component parts are mounted on the wet cell side of the assembly support or support plate and the electrical connection with these component parts is produced by means of a cable tree which is guided through an opening from the dry cell into the wet cell and produces an electrical connection there with the relevant component part by means of a wet cell plug-in connection. By way of example electrical locks are fixed with and without integrated electronics as well as with and without control logics on the wet cell side of the assembly support or the support plate or on the inner door plate and are connected by means of a wet cell plug-in connection on the lock to a cable tree which is guided from the dry cell to the wet cell through an opening in the assembly support or support plate or cover foil.

This type of electrical connection between an electric lock and a cable tree requires a cable guide and the arrangement of a plug-in connection in the wet cell so that additional sealing measures are required on the lock, on the plug-in connection and on the duct for the cable tree from the dry to the wet cell.

SUMMARY OF THE INVENTION

The object of the present invention is to develop a connecting device between electrical and/or electronic component parts or sub-assemblies which has a duct through a wall and which compared to known technical solutions is more cost-effective, more assembly-friendly and more service-friendly and which at the same time has a long service life.

By designing according to the invention the component part holder of at least one of the component parts or sub-assemblies to be connected as an electrical plug connector which engages through the opening in the relevant wall, an optimum position is produced to create the connection between the electrical or electronic component part of a vehicle door and an electrical or electronic vehicle unit. With this arrangement a cable tree can be guided solely in the dry cell of the vehicle door and the plug-in connection can be made with the electrical or electronic component part in the dry cell.

Thus no cable tree seal is required at the interface between the wet and dry cells and additional individual branch seals for the plug-in connection can be omitted. By bringing together various electrical connections in the cable tree of the electrical or electronic component part it is possible to reduce the number of interfaces in the wet cell and thus to improve the quality of the connections. Furthermore the special arrangement of the interface makes it possible to connect an electrical or electronic component part mounted in the wet cell with moisture-sensitive component elements which are mounted in component part units in the dry cell of the vehicle door.

It can also be proposed that the electronics for the electrical or electronic component part is integrated in same. By way of example the control electronics of an electrical or electronic lock is cast in the form of a chip into the electrical or electronic lock.

The solution according to the invention makes it possible to bring together the various electrical connections for the control, regulating and sensor functions into one plug-in connection and to provide the spatial position for the plug-in connection at a favorable spot in the inside of the door, more particularly at the transition between wet cell and dry cell of the vehicle door. Several individual cable connections which in the case of a plug-in connection in the wet cell of the vehicle door have to be sealed individually are thereby unnecessary and, in addition to a connection with a cable tree which combines several electrical leads, a plug-in connection can also be provided with an electronics module so that by way of example the relevant door component is mounted in the wet cell of the vehicle door while the control and regulating electronics is provided on the dry cell side of the vehicle door.

An advantageous development of the solution according to the invention consists accordingly in mounting the component part holder at the interface between the wet cell and dry cell of the vehicle door. The wall through whose opening is passed the component part holder which is formed as the electrical plug-in connection, then represents the partition between the wet cell and dry cell of the vehicle door.

The component part holder and the electrical or electronic component part preferably have a common housing, i.e., the component part holder becomes an integral constituent part of the electrical or electronic component part.

The access through the wall is sealed against dampness in an advantageous design of the invention so that a reliable separation is produced between the wet and dry cells.

In a preferred embodiment of the invention the component part holder or plug-in connector projects through the wall in the direction of the dry cell and closes the opening sealed against dampness. In this way a cable tree can be connected in an assembly-friendly manner to the component part holder or plug-in connector in the dry cell.

The component part holder can be directly fixed by a suitable fastening device on a fastening part of the vehicle door, more particularly the inner door panel, a device covering the cut-out section of the inner door panel or a door base part or assembly support. An advantageous method of fastening lies in the fitting of clip elements on the component part holder so that this can be fixedly connected together with the electrical or electronic component part to the fastening part of the vehicle door after passing the component part holder through an opening in the fastening part of the door which matches the cross-section of the component part holder.

In order to seal the connection of the component part holder with the fastening element of the vehicle door it is possible to provide an additional seal in the area of the duct so that the component part holder sealing adjoins the fastening part of the vehicle door with the electrical or electronic component part.

If the duct and/or the housing part of the component part holder mounted in the duct is formed conical then an additional seal is no longer required between the component part holder or electrical or electronic component part and the fastening part.

By injection molding the leads mounted in the component part holder into the component part holder an electrically and mechanically secure arrangement of the individual leads of the cable tree integrated in the component part holder is fully guaranteed.

Preferably the device according to the invention is used for connecting an electrical or electronic door lock, an electric drive unit for a window raiser or a mirror adjustment device to a cable tree or an electrical or electronic device.

In an advantageous design of the invention the lead guide area of the component part holder or electrical plug-in connector is flexibly designed so that manufacturing and measuring tolerances can be compensated. To this end the lead guide area is preferably formed in an injection part as an expansion and/or compression curve.

DESCRIPTION OF THE DRAWINGS

The idea on which the invention is based will now be explained in further detail with reference to an embodiment shown in the drawings and relating in particular to an electric or electronic lock as the electrical or electronic component part. In the drawings.

DETAILED DESCRIPTION OF THE INVENTION

Figure 1:
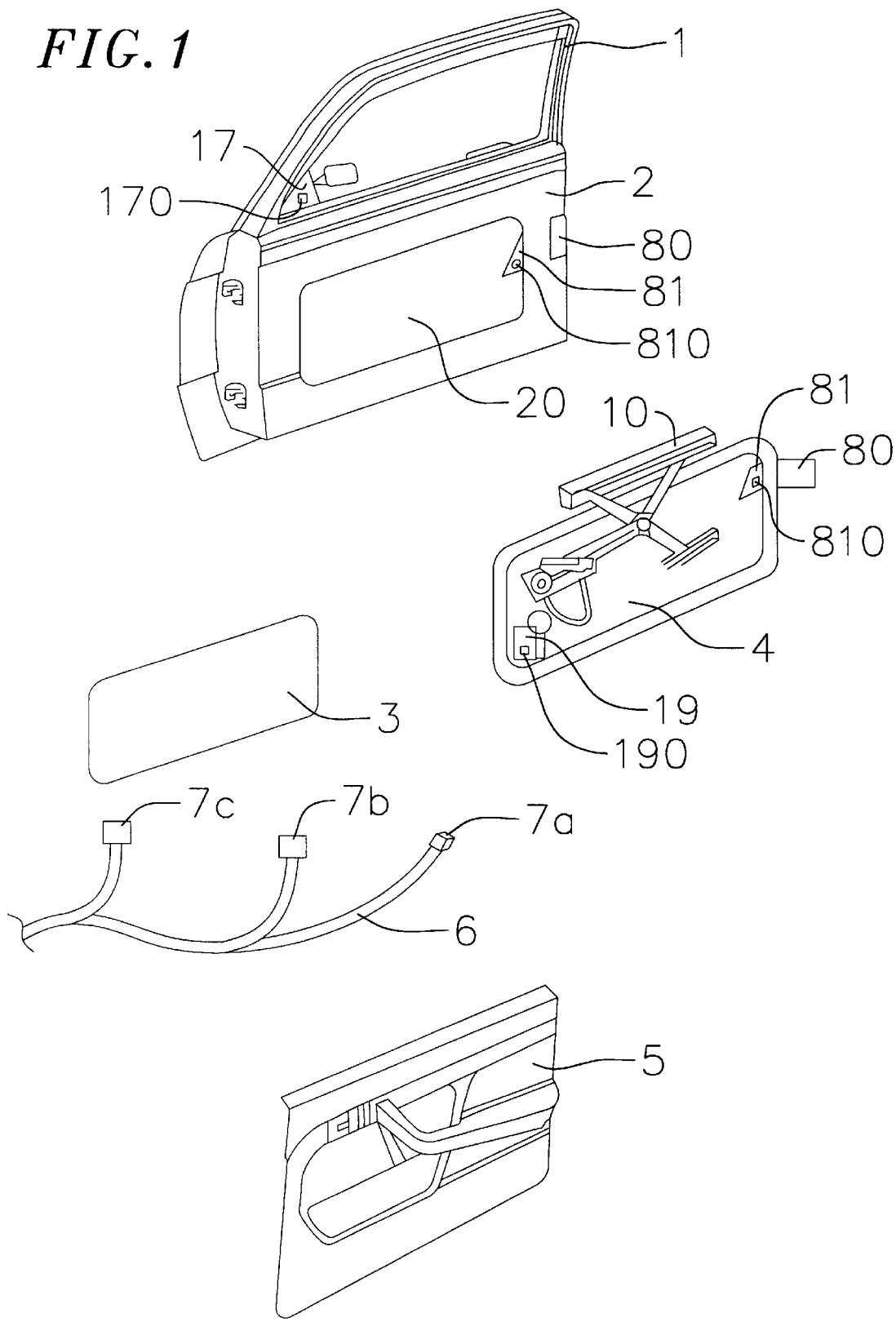
FIG. 1 is an exploded view of a vehicle door.

The exploded view shown in FIG. 1 of a vehicle door shows an outer door panel 1 with a window pane guided in a support frame as well as hinges for attaching the vehicle door to a vehicle frame. The outer door panel 1 changes into an inner door panel 2 which has a cut-out section 20 which is covered by means of a plate or foil 3 or a support plate or an assembly support 4.

A door lock 80 with which the vehicle door can be locked relative to the vehicle frame is mounted on the inner door panel 2 or on the connecting side between the inner door panel 2 and outer door panel 1. The door lock 80 has a fastening part 81 which is fixed on the inner door panel 2 and through which the door lock 80 is mechanically fixed in the vehicle door. An electrical plug-in connector 810 projects out of the fastening part 81 so that a tight-fitting plug-in connection can be fitted there as will be explained in further detail below.

As an alternative to the arrangement of the fastening part 81 on the inner door panel 2, the fastening part 81 is formed on the assembly support or door base part 4 which additionally supports further component elements such as for example a window raiser 10 and the like. The door lock 80 thereby projects over the assembly support or the door base part 4. A plug-in connector 810 projects in turn through the fastening part 81.

The window raiser 10 is an electrically operated window raiser which is driven by an electrical drive unit 19. A plug-in connector 190 projects out of the assembly support or door base part 4 supporting the drive unit 19 and a plug-in connection of, for example, a cable tree can be connected thereto.

An electrical mirror adjuster 17 for adjusting the outside wing mirror, shown diagrammatically, is mounted on the window triangle. A plug-in connection can be attached to a plug connector 170 projecting out of the associated fastening part.

The vehicle door is closed from the inner door space by an inner door trim 5 which has an arm rest, window crank, door locking mechanism and where applicable operating elements for further functioning parts of the vehicle door.

The space between the outer door panel 1 and the inner door panel 2 or the cover foil or plate 3 or door base part or assembly support 4 is defined as a wet cell of the follow cavity of the door while the area between the over plate or foil 3 or between the door base part or assembly support 4 and inner door trim 5 is defined as dry cell.

The electrical plug-in connection between the different component parts of the door mounted in the hollow cavity of the door and a central power supply and control device is produced through individual cable connections which are laid, for example, in grooves of the assembly support 4 and are connected to the individual component parts of the door by means of electrical plug contacts. Alternatively cable trees 6 can also be guided with correspondingly combined plug-in connections 7a, 7b, 7c, to different component parts of the door. By way of example the cable tree 6 having plug-in connections 7a, 7b, 7c illustrated in FIG. 1 is guided with the plug connection 7a to the electric or electronic lock 80 which is fixed on the inner door panel 2 or the door base part or assembly support 4 and which can be designed selectively with or without integrated electronics as well as with or without logics.

The plug-in connections 7b, 7c are guided correspondingly to the further electrical or electronic component parts inside the vehicle door, namely to the electric drive unit 19 for the window lifter as well as to the mirror adjustment device 17.

All the plug-in connections 7a, 7b, 7c are connectable with the plug connectors 810, 190, 170 projecting out of the relevant fastening parts.

Through a special embodiment of the electric or electronic component part 80, 19, 17, as well as by moving a part of the cable tree into the electrical or electronic component part 80, 19, 17, a design is produced which allows the cable guide and plug-in connection to be provided solely in the dry area of the vehicle door while the electrical or electronic component part 80, 19, 17 itself is mounted in the wet cell of the vehicle door.

The following FIGS. 2 to 5 relate to the special design of the electrical or electronic component part as a door lock. However, the electric drive unit 19, as well as the mirror adjustment device 17, are designed in a corresponding way and connected to plug-in connections 7b, 7c.

Figure 2:
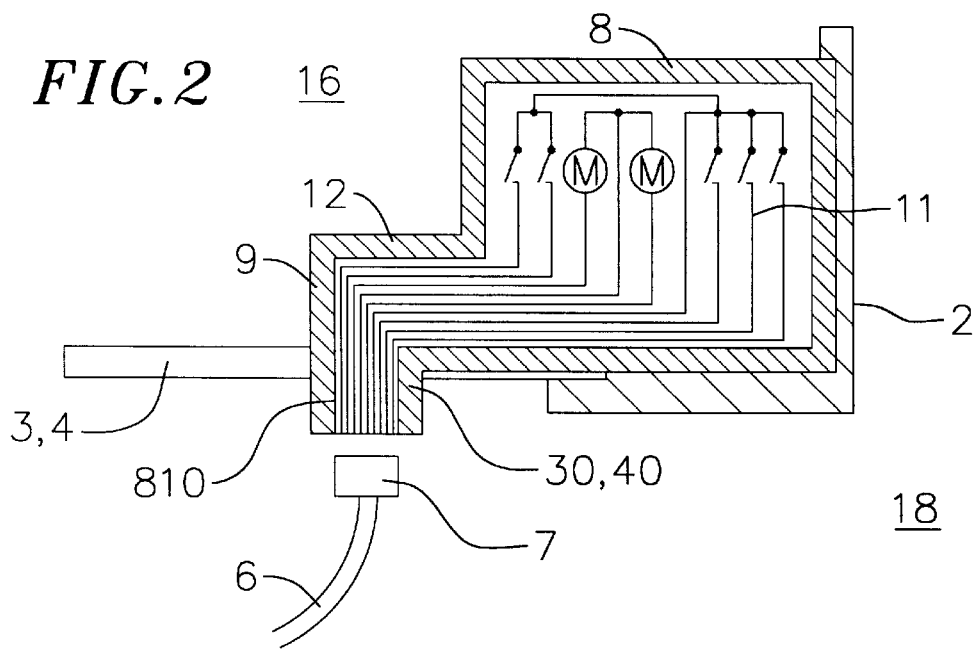
FIG. 2 is a diagrammatic sectional view through an electric or electronic lock with integral lock holder.

FIG. 2 shows a cross-section through an electric or electronic lock 8 having several sub-assembly components 11 mounted therein such as, for example, switch elements or electric motors and a lock holder 9 which is formed as an integral constituent part of the electric or electronic lock 8 and is pushed through an opening 30, 40 of the cover plate or foil 3 connected to the inner door panel 2 or to the assembly support or door base part 4 so that a part of the lock holder 9 projects through the relevant fastening part 2, 3, 4 of the vehicle door.

The preferably cast or injected leads to the individual component elements 11 of the electric or electronic lock 8 are brought together into one lead guide area 12 and form an integral constituent part of the lock holder 9. The lead guide area 12 can be formed by punched parts, by leads stuck or printed thereon or by flexible leads. The part 810 of the lock holder 9 projecting through the fastening element 3, 4 of the vehicle door is connectable to a plug 7 of a cable tree 6 and serves for the socket connection of an electrical or electronic component part.

With the arrangement shown in FIG. 2, of the electronic lock 8 and lock holder 9 in the wet cell 16 of the vehicle door, as well as the arrangement of the plug-in connection between the plug 7 and plug housing part 810 of the lock holder 9, the contacting area between the cable tree 6 or an electrical or electronic component unit (not shown in further detail) is located in the transition area between the dry cell 18 and the wet cell 16 of the vehicle door and is enclosed by a housing of the lock holder 9 protected against dampness. The plug-in connection itself and the cable tree 6 or the electrical or electronic component part are however located solely in the dry cell 18 of the vehicle door so that special dampness protecting means are not required.

Figure 3:
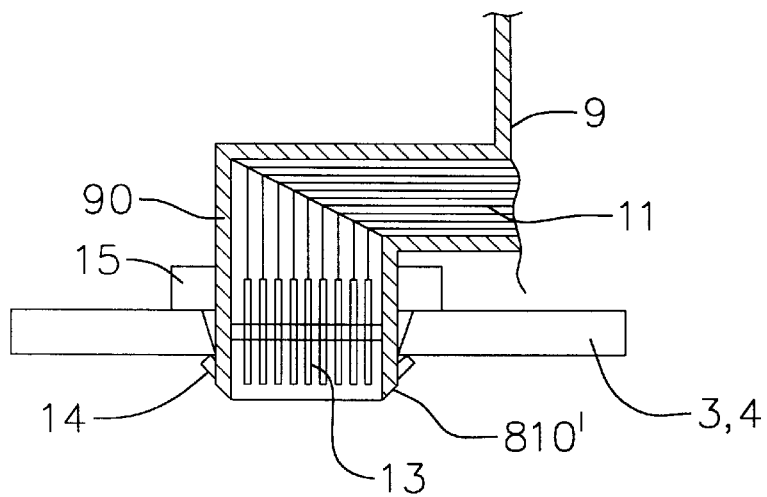
FIG. 3 is a sectional view through the contact area of a lock holder with a seal between the lock holder and a fastening part of the vehicle door.
Figure 4:
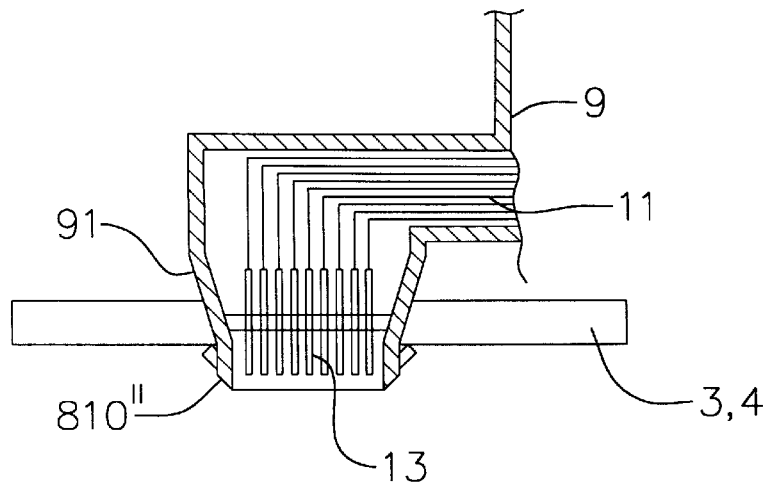
FIG. 4 is a sectional view through the contact area of a lock holder with conical housing which is mounted in a conical duct and is connected by clip connection to a fastening part of the vehicle door.

FIGS. 3 and 4 show various embodiments of the lock holder 9 and the duct 30, 40 in the fastening part 2, 3 4 of the vehicle door.

FIG. 3 shows a cross-section through a lock holder 9 with a cylindrical housing shape 90 in the transition area in which the supply leads which have been combined into a cable tree 11 are preferably cast and lead to a plug-in connection 13 which is mounted in the area of the cylindrical housing opening of the lock support 9.

Clip elements 14 are mounted on the outside of the housing part 90 of the projecting part 810' of the lock support 9 and, after passing the cylindrical housing part 90 of the lock support 9 through the opening 30, 40 in the fastening part 2, 3, 4 of the vehicle door, adjoin the dry cell side of the fastening part 2, 3, 4 to secure the lock holder 9 in position on the fastening part 2, 3, 4.

The through area is sealed by a seal 15 which is mounted between the housing 90 of the lock holder 9 and the wet cell side of the fastening part 2, 3, 4 in the vehicle door and prevents moisture from penetrating into the dry cell of the vehicle door.

FIG. 4 shows another form of housing for the lock holder 9 which avoids the need for an additional seal. In this embodiment the lock holder 9 has in the transition area a conical housing shape 91 which adjoins with keyed engagement the conical through bore 30, 40 of the fastening part 2, 3, 4 of the vehicle door.

Also in this embodiment the lock holder 9 is fixed on the fastening part 2, 3, 4 by clip elements 14. The plug-in connection 13 is located directly in the transition area between the wet cell and dry cell of the vehicle door and serves to hold a plug 7 which is mounted at the end of a cable tree 6 or is connected to an electrical or electronic component part so that the electric or electronic lock 8 having the function elements cast therein is mounted in the wet cell while the connecting area from the wet cell projects into the dry cell and the plug 7 contacts the part 810" of the lock holder 9 which projects through the fastening part 2, 3, 4 on the dry cell side of the vehicle door.

Thus a separate cable tree seal (cover) at the interface between the wet and dry cells is no longer required. As an alternative to the connection with a cable tree the lock electronics can be fitted in the dry cell for example within the framework of a multiplex binding.

Figure 5:
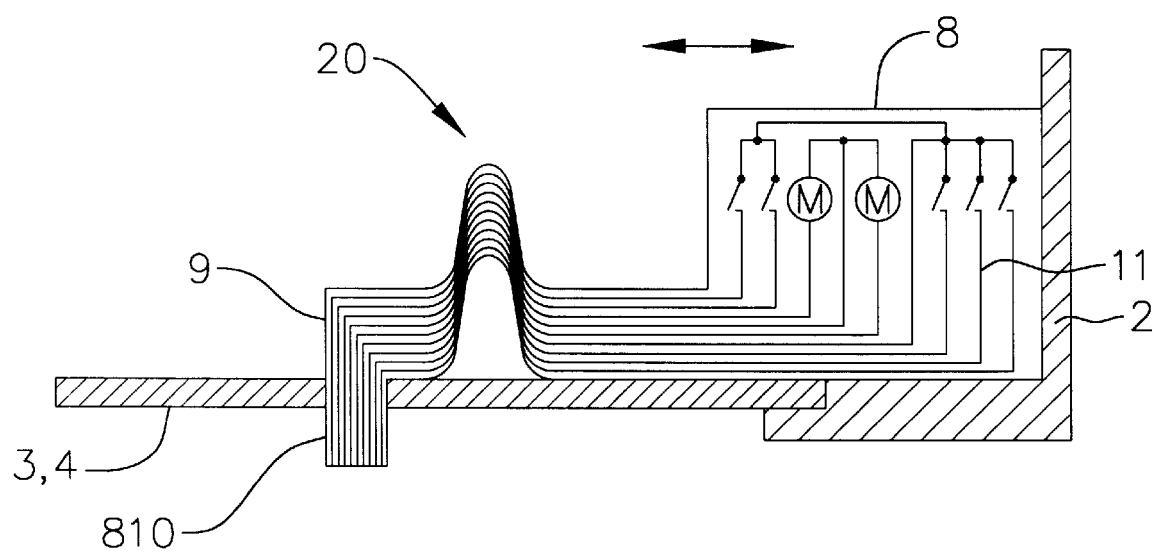
FIG. 5 is a diagrammatic sectional view through an electric or electronic lock with integral lock holder wherein the lead guide area is formed flexible.

FIG. 5 shows an electric or electronic lock 8 with integral lock holder 9 according to FIG. 2 wherein the lead guide area is however flexible. To this end the lead guide area is formed in an injection molded part as flexible expansion and/or compression curves 20. Manufacturing and assembly tolerances which occur can be compensated by suitable expansion or compression of the curves 20.

The advantages which can be achieved with the invention by moving the interface and holding area of a part of the cable tree into the fastening area of the electrical or electronic component part are also suitable for those types of inside door space where door panels are used which do not separate the wet cell completely from the dry cell.

What is claimed is:

1. A device for producing an electrical plug-in connection in a vehicle door, comprising:

an electrical or electronic component part or subassembly;

a fastening part having a wall with a duct opening, wherein the fastening part forms a partition between a wet cell and a dry cell of the vehicle door;

a component part holder which mechanically fixes the component part or subassembly in the vehicle door;

an electrical plug-in connector which engages through the duct opening in the wall of the fastening part in the direction of the dry cell, the electrical plug-in connector having electrical leads, wherein the component part holder is mounted on the fastening part;

wherein the component part holder has a housing mounted in the wet cell and contains the component part or subassembly as well as the electrical leads to the plug-in connector;

wherein a part of the component part holder is formed as the plug-in connector; and wherein the plug-in connector closes the duct opening sealed against dampness.

2. A device according to claim 1 wherein the component part holder has a plurality of clip elements mounted on an end side of the component part holder, the clip elements being fixed on the fastening part after pushing the holder through the duct opening in the fastening part wherein the duct opening matches the cross-section of the component part holder.

3. A device according to claim 1 comprising a seal between the component part holder and the fastening part of the vehicle door which seals the duct opening in the fastening part.

4. A device according to claim 1 wherein the electrical leads are mounted in the component part holder and are formed as a cable tree.

5. A device according to claim 1 wherein the electric leads mounted in the holder are injection molded.

6. A device according to claim 1 further comprising additional component parts or sub-assemblies and a cable tree connecting the component parts or sub-assemblies to the electrical or electronic component part of the vehicle door, or of a further electrical or electronic component part.

7. A device according to claim 1 wherein at least one of the duct opening or the housing of the component holder mounted in the duct opening has a conical shape.

8. A device according to claim 1 wherein the electrical or electronic component part comprises at least one of an electric or electronic lock, an electric drive unit for a window raiser a mirror adjustment device.

9. A device according to claim 1 wherein the electrical plug-in connector comprises a lead guide area, the lead guide area being formed flexible so that manufacturing and measuring tolerances can be compensated.

10. A device according to claim 9 wherein the lead guide area is formed in an injection molded part having at least one curve.

11. A device according to claim 1 wherein the component part or sub-assembly is injection molded.

12. A device according to claim 1 wherein the fastening part comprises one of an inner door panel, a support plate, a door base part or an assembly support.

* * * * *